United States Patent
Adachi et al.

(10) Patent No.: US 8,917,277 B2
(45) Date of Patent: Dec. 23, 2014

(54) ANIMATION CONTROL DEVICE, ANIMATION CONTROL METHOD, PROGRAM, AND INTEGRATED CIRCUIT

(75) Inventors: Takao Adachi, Hyogo (JP); Hidehiko Shin, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 325 days.

(21) Appl. No.: 13/395,663

(22) PCT Filed: Jun. 22, 2011

(86) PCT No.: PCT/JP2011/003561
§ 371 (c)(1),
(2), (4) Date: Mar. 13, 2012

(87) PCT Pub. No.: WO2012/008097
PCT Pub. Date: Jan. 19, 2012

(65) Prior Publication Data
US 2012/0169741 A1     Jul. 5, 2012

(30) Foreign Application Priority Data
Jul. 15, 2010    (JP) ................. 2010-160997

(51) Int. Cl.
*G06T 13/00*      (2011.01)
*G06F 9/44*      (2006.01)
*G06T 15/00*      (2011.01)

(52) U.S. Cl.
CPC .............. *G06F 9/4443* (2013.01); *G06T 13/00* (2013.01); *G06T 15/005* (2013.01)
USPC ......................................... 345/473

(58) Field of Classification Search
CPC .................................................. G06T 2210/36

USPC ....................................... 345/428, 473–475
See application file for complete search history.

(56) References Cited

U.S. PATENT DOCUMENTS 6,396,509 B1 *   5/2002   Cheng ........................... 715/706
6,459,432      10/2002   Suzuki et al.
6,646,644 B1    11/2003   Suzuki et al.
(Continued)

FOREIGN PATENT DOCUMENTS

JP     11-203504     7/1999
JP     11-339060     12/1999
(Continued)

OTHER PUBLICATIONS

International Search Report issued Jul. 26, 2011 in International (PCT) Application No. PCT/JP2011/003561.

*Primary Examiner* — Kee M Tung
*Assistant Examiner* — Ryan D McCulley
(74) *Attorney, Agent, or Firm* — Wenderoth, Lind & Ponack, L.L.P.

(57) ABSTRACT

An animation control device includes a priority identifying unit that identifies priorities of a plurality of animation parts with reference to part priority information; an animation executing unit; a determining unit that determines whether the amount of operation needed for the animation is greater than a first appropriate value; and a part control unit that changes the content of control of the animation of the change target part, which is an animation part having a low priority, from a first content of control to a second content of control when it is determined that the amount of operation needed for the animation is greater than the first appropriate value. The animation executing unit performs the animation of the change target part according to the second content of control, and performs the animation of a non-change-target part according to the first content of control.

12 Claims, 8 Drawing Sheets

(56) References Cited

U.S. PATENT DOCUMENTS

2008/0278486 A1* 11/2008 Royan et al. ............... 345/420
2009/0109229 A1* 4/2009 Hamilton et al. ........... 345/474
2010/0127971 A1* 5/2010 Ellenby ...................... 345/156

FOREIGN PATENT DOCUMENTS

| JP | 2002-018122 | 1/2002 |
| JP | 2002-278658 | 9/2002 |

* cited by examiner

FIG. 2

CPU appropriateness information d1

| Application name | CPU appropriateness range (%) |
|---|---|
| Picture Viewer | 20 - 30 |
| List of recorded pictures | 40 - 50 |
| Program list | 10 - 15 |
| ... | |

FIG. 3

Part priority information d2

| Animation part | Priority |
|---|---|
| A | High |
| B | High |
| C | Low |
| D | Low |
| E | Low |

FIG. 4

Part state control information d3

| Priority of animation part | Content of control |
|---|---|
| High | Animation |
| Low | Animation |

Part state control information d3

| Priority of animation part | Content of control |
|---|---|
| High | Animation |
| Low | No animation |

ANIMATION CONTROL DEVICE, ANIMATION CONTROL METHOD, PROGRAM, AND INTEGRATED CIRCUIT

BACKGROUND OF INVENTION

1. Technical Field

The present invention relates to a device for controlling animation of an image displayed on a display.

2. Background Art

Conventionally, for users to operate household electrical apparatuses such as a television set, a video player, and a DVD (Digital Versatile Disc) player (hereinafter, referred to as an apparatus), the display of the television set or the like uses a GUI (Graphical User Interface) application program for displaying an image by which the operation is received (hereinafter, referred to an application). Moreover, at present, applications including animation have been increased. In animation, a state of the animation part (for example, at least one of the position, the size, the shape, the color, and the degree of transparency) is gradually changed at a constant interval of time and the changed animation part is displayed. The constant interval of time is determined in advance for each display, and specifically determined by a refresh rate of the display called a vertical synchronous frequency set for the display. The animation part is an image (GUI part) displayed as a target for the animation by the application.

Namely, in order to implement the animation according to the application, an animation control device provided in the conventional apparatus performs processing to refresh a content of drawing at every constant interval of time. For example, when the vertical synchronous frequency set for the display is 60 Hz, the content of drawing can be refreshed only 60 times per second in the display. In this case, the constant interval of time is 16.6 ms. Hereinafter, the constant interval of time is referred to a refresh interval.

FIG. 11 is a drawing showing an example of animation according to the conventional animation control device.

The conventional animation control device executes an application. By the application, as shown in (a) of FIG. 11, while an animation part 202 displayed on a display 201 is enlarged over a predetermined time (drawing processing time), the animation part 202 is moved in a predetermined drawing direction (the arrow in (a) of FIG. 11) to be displayed as an animation part 203. At this time, in order to implement the animation, the animation control device performs the processing to refresh the content of drawing at every refresh interval during the drawing processing time, as shown in (b) of FIG. 11. Namely, when the animation is started and the refresh interval has passed, the animation control device enlarges the animation part 202 slightly and moves the animation part 202 to the drawing direction. Subsequently, every time when the refresh interval has passed, the animation control device repeatedly performs the enlargement and movement of the displayed animation part 202 (the processing to refresh the content of drawing). Thus, the animation part 203 is displayed on the display 201 when the animation is started and the drawing processing time has passed.

The application is set so as to perform the processing to refresh the content of drawing during the drawing processing time by the number of times of the refresh interval that passes. For example, when the vertical synchronous frequency to be set for the display is 60 Hz, and the drawing processing time until the animation part 202 is moved and displayed as the animation part 203 is 2 seconds, the application needs to be set so as to perform the processing to refresh the content of drawing 120 times.

The processing to refresh the content of drawing is performed at every refresh interval to implement the animation. Namely, the animation part 202 is moved during the drawing processing time in the drawing direction, and finally displayed as the animation part 203.

Here, now, for example, the same application distributed by a network or the like may be performed in a plurality of different apparatuses. However, the number of the animation parts to be moved at every refresh interval of the display may be different for each of the animation control devices provided in these apparatuses, for example, because the CPUs (Central Processing Units) of these apparatuses have different clock frequencies. Even in the apparatuses having the CPU of the same clock frequency, the number of the animation parts to be moved may be different according to the state of use of the CPU.

Accordingly, in the prior art, an animation control device has been provided in which quality of display of the animation is switched between high quality and low quality according to a CPU usage rate (for example, see PTL 1). The animation control device in PTL 1 changes frame rates of icons, menus, and moving pictures when the CPU usage rate is high, and reduces the CPU usage rate.

CITATION LIST

Patent Literature

[PTL 1] Japanese Unexamined Patent Application Publication No. 2002-278658

SUMMARY OF INVENTION

Unfortunately, the animation control device in PTL 1 undesirably reduces the total quality of display of the animation, and cannot implement the animation intended by an application developer.

Specifically, in the animation control device in PTL 1, the animation is performed according to the application when the CPU usage rate is low. When the CPU usage rate is high, not according to the application, the frame rate of the animation, namely the amount of the animation subjected to the drawing processing is changed such that the CPU usage rate is reduced. At this time, the total quality of the entire screen to be displayed by the application, namely, the quality of the animation of all the animation parts on the display is undesirably reduced, and the animation intended by the application developer is not performed.

Accordingly, the present invention has been made in consideration of such problems, and an object of the present invention is to provide an animation control device in which reduction in the total quality of the animation to be displayed can be suppressed, and animation intended by an application developer can be performed.

In order to achieve the object above, the animation control device according to the present invention is an animation control device that controls animation according to an application program, the device including: a priority identifying unit configured to identify priorities of a plurality of drawing-target parts, which are images for display, with reference to part priority information indicating the priorities of the plurality of drawing-target parts, the priorities being set for the application program; an animation executing unit configured to perform animation of the plurality of drawing-target parts; a determining unit configured to determine whether a determination value is greater than a first appropriate value, the determination value being an amount of operation needed for the animation of the plurality of drawing-target parts by the animation executing unit according to a first content of control; and a part control unit configured to change a content of control for the animation of a change target part from the first content of control to a second content of control so as to more significantly reduce the amount of operation needed for the animation of the change target part as the priority identified by the priority identifying unit is lower, the change target part being the drawing-target part corresponding to the priority, when the determining unit determines that the determination value is greater than the first appropriate value, wherein the animation executing unit is configured to perform the animation of the change target part according to the second content of control, and perform the animation of a non-change-target part according to the first content of control, the non-change-target part being a drawing-target part other than the change target part among the plurality of drawing-target parts. For example, the animation control device further includes a central processing unit (CPU), wherein the animation executing unit is configured to cause the CPU to perform operation needed for the animation of the plurality of drawing-target parts according to the first content of control, and the determining unit is configured to perform the determination by treating, as the determination value, a usage rate of the CPU used for the operation.

Thereby, when the usage rate of the CPU (CPU average usage rate), which is the amount of operation needed for the animation of the plurality of drawing-target parts (animation parts) according to the first content of control is greater than the first appropriate value, the content of control for the drawing-target part having a low priority, namely the animation of the change target part is changed from the first content of control to the second content of control. Thereby, the animation of the drawing-target part having a low priority is limited (such that the amount of operation is reduced). On the other hand, the content of control for the animation of the drawing-target part having a high priority, namely the non-change-target part is not changed. For this reason, the animation of the drawing-target part having a high priority is performed according to the first content of control without limitation. Further, when the amount of operation is large, the animation of the drawing-target part having a low priority is limited. For this reason, the amount of operation can be suppressed, a margin can be given to the operation, and the animation of the animation part having a high priority can be properly performed. Accordingly, the animation of all the plurality of animation parts can be prevented from being limited, and reduction in the total quality of the animation to be displayed can be suppressed. Further, if the application developer sets a high priority for the target animation part for the animation intended by the application developer in the part priority information d2, the animation intended by the application developer can be performed even if the usage rate of the CPU is high.

Moreover, the animation control device further includes a storage unit configured to store part state control information indicating the first content of control of the priority for each priority; and a measuring unit configured to measure the amount of operation used for the animation of the plurality of drawing-target parts by the animation executing unit according to the first content of control, wherein the determining unit is configured to perform the determination using the amount of operation measured by the measuring unit as the determination value, the part control unit is configured to change the first content of control corresponding to the priority of the change target part to the second content of control, the first content of control corresponding to the priority of the change target part being indicated by the part state control information stored in the storage unit, and the animation executing unit is configured to perform the animation of the plurality of drawing-target parts according to the first and second contents of control which are indicated by the part state control information stored in the storage unit.

Thereby, when the animation of the plurality of drawing-target parts according to the first content of control is performed, the amount of operation used for the animation is measured, and the measured actual amount of operation is treated as the determination value. Accordingly, using an accurate determination value, it can be determined whether the determination value is greater than the first appropriate value. Further, in response to the result of determination, the content of control of the part state control information stored in the storage unit is changed. Accordingly, when the animation of the plurality of drawing-target parts is performed again, the animation is performed according to the updated part state control information stored in the storage unit. For this reason, the animation can be properly controlled based on an experience in the past.

Moreover, the part control unit is configured to change the content of control for the animation of the change target part from the first content of control to the second content of control, the first content of control indicating that the animation is performed, the second content of control indicating that the animation is not performed, and the animation executing unit is configured to perform the animation of the non-change-target part according to the first content of control, and not to perform the animation of the change target part according to the second content of control.

Thereby, the animation of the drawing-target part having a low priority is not performed. Accordingly, the amount of operation used for the animation of the plurality of drawing-target parts can be securely reduced, and the animation of the drawing-target part having a high priority can be securely performed according to the first content of control intended by the application developer.

Moreover, the part control unit is configured to change the content of control for the animation of the change target part from the first content of control indicating a first frame rate to the second content of control indicating a second frame rate lower than the first frame rate, and the animation executing unit is configured to perform the animation of the non-change-target part according to the first content of control at the first frame rate, and perform the animation of the change target part according to the second content of control at the second frame rate.

Thereby, the frame rate of the animation of the drawing-target part having a low priority is reduced. Accordingly, the amount of operation used for the animation of the plurality of drawing-target parts can be reduced, and reduction in the number of the drawing-target part subjected to the animation can be prevented.

Moreover, the animation control device further includes an information generating unit configured to determine a priority of each of the drawing-target parts, and generate the part priority information indicating the determined priority. For example, the plurality of drawing-target parts includes a first drawing-target part and a second drawing-target part having a smaller size of a region to be displayed than a size of a region to be displayed of the first drawing-target part, and the information generating unit is configured to determine the priorities of the first and second drawing-target parts such that the priority of the first drawing-target part is higher than the priority of the second drawing-target part. Alternatively, the plurality of drawing-target parts includes a first drawing-target part and a second drawing-target part having a smaller size of data than a size of data of the first drawing-target part, and the information generating unit is configured to determine priorities of the first and second drawing-target parts such that the priority of the first drawing-target part is higher than the priority of the second drawing-target part.

For example, the application developer tends to more strongly desire that the animation of the drawing-target part should be performed as the drawing-target part has a larger size of the region to be displayed or a larger size of data. Accordingly, the priority is determined according to the size of the region to be displayed and the size of the data, and the part priority information indicating the determined priority is generated; thereby, the application developer does not need to intentionally set the priority in the part priority information, and can improve developing efficiency of the application.

Moreover, the animation control device further includes a history recording unit configured to record a history of the drawing-target part operated by a user as an operation history for each of the drawing-target parts, wherein said information generating unit is configured to determine the priority of each drawing-target part, based on the recorded operation history of the drawing-target part.

For example, the application developer tends to more strongly desire that the animation of the drawing-target part should be performed as the drawing-target part is more frequently operated by the user, or the drawing-target part is operated in a shorter time from the previous operation. Accordingly, the priority is determined based on the operation history of the drawing-target part, and the part priority information indicating the determined priority is generated; thereby, the application developer does not need to intentionally set the priority in the part priority information, and can improve the developing efficiency of the application.

Moreover, the determining unit is further configured to determine whether the determination value is smaller than a second appropriate value smaller than the first appropriate value, the part control unit is further configured to change the content of control for the animation of a change processing target part from the first content of control to a third content of control so as to more significantly increase the amount of operation needed for the animation of the change target part at a smaller change rate as the priority identified by the priority identifying unit is lower, the change target part being the drawing-target part corresponding to the priority, when the determining unit determines that the determination value is smaller than the second appropriate value, and the animation executing unit is further configured to perform the animation of the change processing target part according to the third content of control, and perform the animation of the non-change-target part according to the first content of control, the non-change-target part being the drawing-target part other than the change target part among the plurality of drawing-target parts.

For example, the first content of control for the drawing-target part having a low priority is that the animation is limited, and the first content of control for the drawing-target part having a high priority is that the animation is not limited. At this time, when the usage rate of the CPU (CPU average usage rate), which is the amount of operation needed for the animation of the plurality of drawing-target parts according to the first content of control, is smaller than the second appropriate value, the content of control for the drawing-target part having a low priority, namely, the animation of the change processing target part is changed from the first content of control to the third content of control to cancel the limitation on the animation of the change processing target part. Accordingly, when the animation of the drawing-target part having a low priority is limited more than necessary by the first content of control, the limitation can be cancelled.

Moreover, when the drawing-target part having a high priority, the drawing-target part having a middle priority, and the drawing-target part having a low priority exist, the contents of control of the animation of the drawing-target part having a middle priority and the drawing-target part having a low priority are changed from the first content of control to the third content of control such that the amount of operation needed for the animation of the drawing-target part having a middle priority is more significantly increased at a larger change rate than the amount of operation needed for the animation of the drawing-target part having a low priority. Namely, the limitation on the animation of the drawing-target part having a middle priority is cancelled with higher priority than that on the drawing-target part having a low priority. Accordingly, even when the limitation of the animation is cancelled, the animation of the drawing-target part having a low priority can be more limited than the animation of the drawing-target part having a middle priority and the drawing-target part having a high priority.

The present invention can be implemented not only as such an animation control device, but also as a method for processing operation in the animation processing device, a program for causing a computer to execute the processing operation, a storage medium for storing the program, or an integrated circuit for functioning as an animation control device.

The animation control device according to the present invention can suppress reduction in the total quality of the animation to be displayed, and perform animation intended by an application developer.

BRIEF DESCRIPTION OF DRAWINGS

FIG. 2 is a drawing showing an example of CPU appropriateness information according to the embodiment of the present invention.

FIG. 3 is a drawing showing an example of part priority information according to the embodiment of the present invention.

FIG. 4 is a drawing showing an example of part state control information according to the embodiment of the present invention.

DETAILED DESCRIPTION OF INVENTION

Hereinafter, an animation control device according to an embodiment of the present invention will be described with reference to the drawings.

The animation control device according to the present embodiment is a device for executing a GUI application program (application) to implement a function as a GUI, and that performs animation of an animation part (drawing-target part). For example, such an animation control device is provided in apparatuses such as a recording and reproducing apparatus for a moving picture or a still picture (for example, a DVD player), and executes the application to display a list of thumbnails of the recorded moving pictures or still pictures. At this time, for example, the animation control device uses the thumbnails as an animation part, and performs the animation of these animation parts (thumbnails) to display the list. In such an animation control device, as the effect, reduction in the total quality of the animation to be displayed is suppressed, and the animation intended by an application developer can be performed.

In the present embodiment, the animation means that the state of the animation part (for example, at least one of the position, the size, the shape, the color, and the degree of transparency) is slightly changed at every refresh interval to display the animation part. Moreover, the processing to perform the animation is a processing to change the state of the animation part at every refresh interval, and display the animation part with the changed state.

Figure 1:
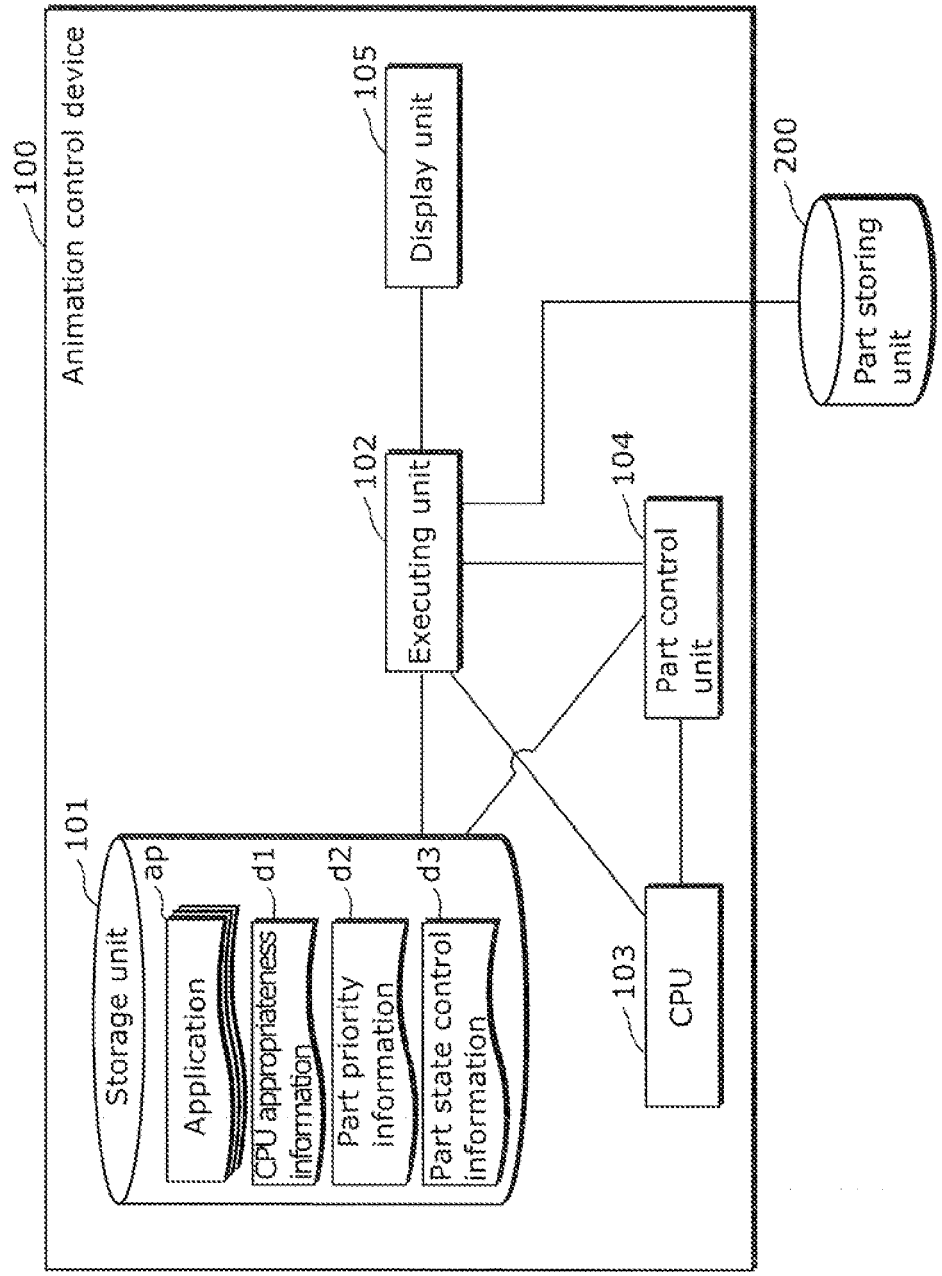
FIG. 1 is a block diagram showing an example of a configuration of an animation control device according to an embodiment of the present invention.

FIG. 1 is a block diagram showing an example of a configuration of an animation control device according to the present embodiment.

An animation control device 100 according to the present embodiment includes a storage unit 101, an executing unit 102, a CPU 103, a part control unit 104, and a display unit 105.

The storage unit 101 stores a plurality of applications ap, CPU appropriateness information d1 indicating an appropriate usage rate for the CPU 103, part priority information d2 indicating a plurality of animation parts and the priority of each animation part, and part state control information d3 indicating a content of control for the state (animation) of the animation part according to the priority of the animation part.

The executing unit 102 selects one application ap from the plurality of applications ap stored in the storage unit 101, and reads and executes the selected application ap. Hereinafter, the application ap executed by the executing unit 102 is referred to as an application ap.

The executing unit 102 also identifies the content of control for the animation of a plurality of animation parts, based on the part priority information d2 and part state control information d3 stored in the storage unit 101. The executing unit 102 performs the animation of the plurality of animation parts according to the identified content of control. When the identified content of control indicates that no animation is performed, the executing unit 102 does not perform the animation on the animation part corresponding to the content of control.

Moreover, when the executing unit 102 performs the animation of the plurality of animation parts, the executing unit 102 refreshes the content of drawing at every refresh interval during a drawing processing time. The drawing processing time is the time determined by the executed application ap, during which the animation is performed. In the processing to refresh the content of drawing, the executing unit 102 produces an image to be displayed in which at least part of one or more animation parts for the animation are drawn, and outputs the image to be displayed to the display unit 105. Such an image to be displayed is produced at every refresh interval, and the images to be displayed produced at every refresh interval are different from each other. Namely, when the executing unit 102 performs the animation, the executing unit 102 sequentially produces and outputs the images to be displayed different from each other at every refresh interval such that the states of one or more animation parts for the animation are gradually changed on the image to be displayed. The executing unit 102 reads the plurality of animation parts, which are set for the executed application ap in advance, from a part storing unit 200, and uses the animation parts in the processing to refresh the content of drawing.

Moreover, when the executing unit 102 executes the application ap and performs the animation, the executing unit 102 causes the CPU 103 to execute operation needed for these.

In response to an instruction from executing unit 102, the CPU 103 performs the operation to perform the execution of the application ap and the animation by the executing unit 102.

The part control unit 104 calculates a CPU average usage rate of the CPU 103, and the content of control of the part state control information d3, based on the CPU average usage rate and the CPU appropriateness information d1 stored in the storage unit 101. In the present embodiment, the part control unit 104 is configured as a measuring unit that measures the amount of operation used in the animation of the plurality of animation parts according to the part state control information d3 by the executing unit 102 (the CPU usage rate or the CPU average usage rate).

The display unit 105 includes a liquid crystal display or a PDP (Plasma Display Panel), for example, and receives the image to be displayed output from the executing unit 102 at every refresh interval and displays the image to be displayed.

Here, the information stored in the storage unit 101 will be described in detail.

FIG. 2 is a drawing showing an example of the CPU appropriateness information d1.

As shown in FIG. 2, the CPU appropriateness information d1 indicates a name of the application ap (application name) and the range of the appropriate usage rate of the CPU 103 for the application ap (CPU appropriateness range) for each application ap stored in the storage unit 101. The CPU appropriateness range is an appropriate proportion (for example, the percentage) of the CPU 103 that may be used by the application ap from a viewpoint of the whole apparatus (for example, a recording and reproducing apparatus), and is determined by a developer of the application ap. Specifically, in an application ap for viewing a recorded picture, the CPU appropriateness information d1 indicates the application name of the application ap "Picture Viewer" and the CPU appropriateness range for the application ap of "20 to 30%." The upper limit value in the CPU appropriateness range is a first appropriate value, and the lower limit value is a second appropriate value.

FIG. 3 is a drawing showing an example of the part priority information d2.

As shown in FIG. 3, the part priority information d2 indicates the priority of the animation part for each animation part set for the application ap in advance. Such a priority is determined by the developer of the application ap. For example, the part priority information d2 shown in FIG. 3 indicates the respective priorities of the animation parts A to E set in the application ap Picture Viewer in advance. Specifically, the part priority information d2 indicates that the priority of the animation parts A and B is "high" and that of the animation parts C to E is "low."

FIG. 4 is a drawing showing an example of the part state control information d3.

As shown in FIG. 4, for each priority, the part state control information d3 indicates the content of control for the animation of the animation part corresponding to the priority. The content of control is "animation" or "no animation," for example. The content of control of "animation" indicates that the animation is performed, and "no animation" indicates that the animation is not performed. Namely, the part state control information d3 shown in FIG. 4 indicates the "animation," namely, performing of the animation for both of the priorities "high" and "low." Such a content of control in the part state control information d3 is updated by the part control unit 104 for each priority.

Figures 5, 6:
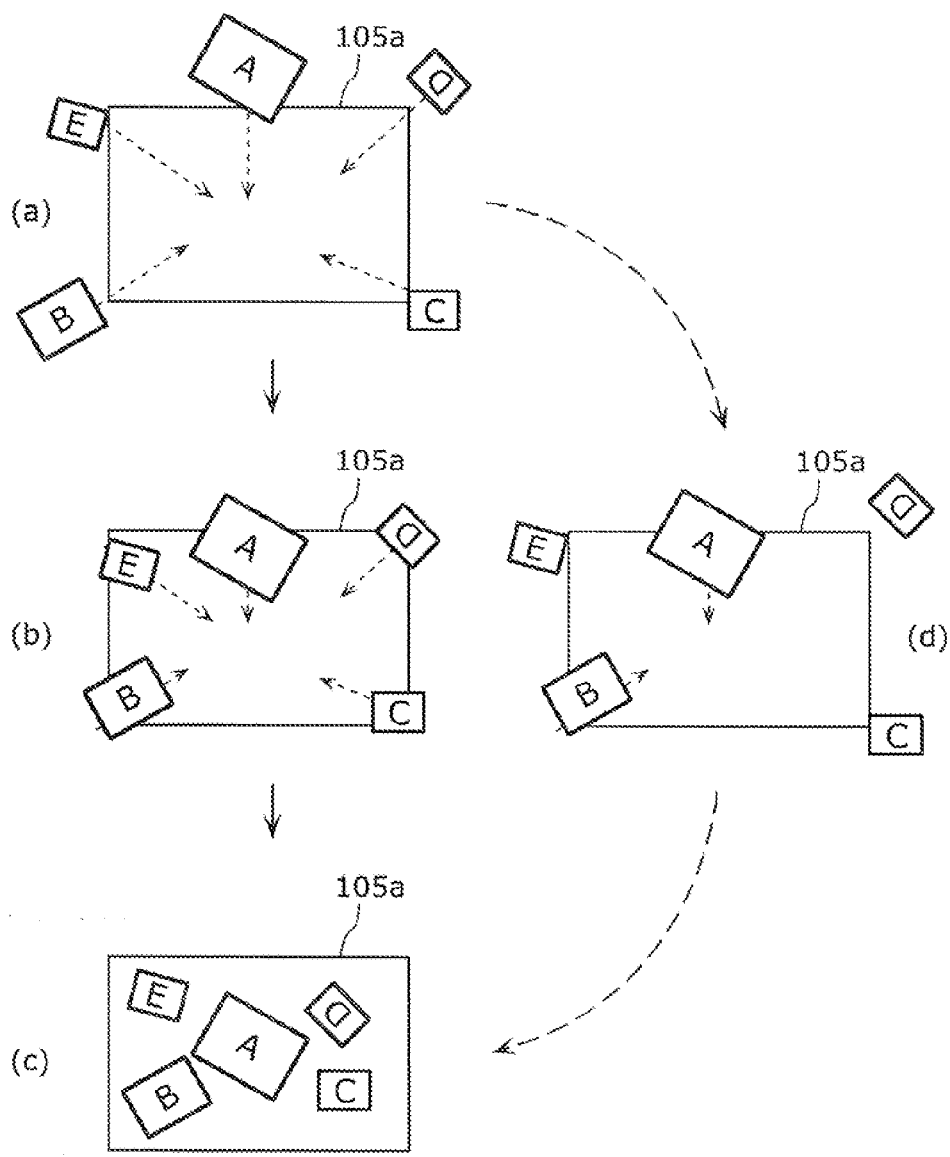
FIG. 5 is a drawing showing an example of the updated part state control information according to the embodiment of the present invention.
FIG. 6 is a drawing showing animation by the animation control device according to the embodiment of the present invention.

FIG. 5 is a drawing showing an example of the refreshed part state control information d3.

For example, when the part state control information d3 is updated, the updated part state control information d3 indicates the content of control "animation" for the priority "high," and indicates the content of control "no animation" for the priority "low." Namely, the part state control information d3 shown in FIG. 5 indicates that the animation is performed on the animation part corresponding to the priority "high," and that the animation is not performed on the animation part corresponding to the priority "low."

FIG. 6 is a drawing showing the animation by the animation control device 100.

For example, when the executing unit 102 reads the application ap Picture Viewer as an application ap to be executed from the storage unit 101 and executes the application ap, the executing unit 102 performs the animation for displaying a list of pictures in thumbnails. Namely, the executing unit 102 produces a different image to be displayed at every refresh interval, and displays the image on the display unit 105. The list of pictures includes the animation parts A to E that are thumbnails.

Before performing the animation, first, the executing unit 102 reads the part priority information d2 and the part state control information d3 from the storage unit 101. Based on these, the executing unit 102 selects the animation part for the animation. Namely, based on the part priority information d2, the executing unit 102 determines that the priorities of the animation parts A and B are "high" and those of the animation parts C to E are "low." Further, based on the part state control information d3 shown in FIG. 4, the executing unit 102 determines that the animation is performed on the animation part having the priority "high" and that having the priority "low." As a result, the executing unit 102 selects the animation parts A to E as the animation part for the animation.

Next, as shown in (a)→(b)→(c) of FIG. 6, the executing unit 102 performs the animation of the selected animation part. First, the executing unit 102 produces an image to be displayed at the time of starting the animation, and displays the image on the display unit 105. As a result, as shown in (a) of FIG. 6, of the animation parts A to E, only part of the animation part A is displayed on a display region 105a of the display unit 105.

Further, when the refresh interval has passed, the executing unit 102 produces a new image to be displayed, and displays the image on the display unit 105. As a result, as shown in (b) of FIG. 6, each part of the animation parts A to E is displayed on the display region 105a of the display unit 105. Further, when the drawing processing time has passed, the executing unit 102 produces a new image to be displayed, and displays the image on the display unit 105. As a result, as shown in (c) of FIG. 6, all the animation parts A to E are stopped at predetermined positions in the display region 105a of the display unit 105, and displayed.

Such animation shown in (a)→(b)→(c) of FIG. 6 is performed according to the part state control information d3 without limitation, and the animation parts A to E are displayed so as to be faded into the inside of the display region 105a from the outside thereof. In FIG. 6, the arrow of the dashed line from the animation part represents the direction of the animation part moving (drawing direction).

The part control unit 104 obtains the CPU appropriateness information d1 from the storage unit 101. When the animation by the executed application ap (for example, the animation shown in (a)→(b)→(c) of FIG. 6) is started, the part control unit 104 monitors the usage rate of the CPU 103. The CPU appropriateness information d1 also indicates the CPU appropriateness range of the executed application ap, i.e., the application ap Picture Viewer. Then, the part control unit 104 determines that the CPU average usage rate for the animation based on the usage rate of the CPU 103 is out of the CPU appropriateness range, and when the CPU average usage rate is out of the range, the part control unit 104 updates the part state control information d3. For example, when the CPU average usage rate of the CPU 103 is higher than the CPU appropriateness range (the first appropriate value), the part control unit 104 updates the part state control information d3 such that the content of control "no animation" is indicated for the priority "low." Namely, the part state control information d3 shown in FIG. 4 is updated to the part state control information d3 shown in FIG. 5.

When the part state control information d3 is thus updated and the executing unit 102 performs the animation by the application ap Picture Viewer again, the executing unit 102 performs the animation according to the updated part state control information d3 shown in FIG. 5. Namely, before performing the animation again, based on the part priority information d2, the executing unit 102 determines that the priorities of the animation parts A and B are "high" and those of the animation parts C to E are "low." Further, based on the updated part state control information d3 shown in FIG. 5, the executing unit 102 determines that the animation is performed only on the animation part having a priority "high." As a result, the executing unit 102 selects only the animation parts A and B as the animation part for the animation.

Next, as shown in (a)→(d)→(c) of FIG. 6, the executing unit 102 performs the animation on the selected animation part. First, executing unit 102 produces an image to be displayed at the time of starting the animation, and displays the image on the display unit 105. As a result, as shown in (a) of FIG. 6, of the animation parts A to E, only part of the animation part A is displayed in an upper portion of the display region 105a of the display unit 105.

Further, when the refresh interval has passed, the executing unit 102 produces a new image to be displayed, and displays the image on the display unit 105. As a result, as shown in (d) of FIG. 6, parts of animation parts A and B are displayed in the display region 105a of the display unit 105. At this time, the animation parts C to E are not displayed. Further, when the drawing processing time has passed, the executing unit 102 produces a new image to be displayed, and displays the image on the display unit 105. As a result, as shown in (c) of FIG. 6, all the animation parts A to E are displayed in the display region 105a of the display unit 105.

Such animation shown in (a)→(d)→(c) of FIG. 6 is limited by the part state control information d3 and performed, and only the animation parts A and B are displayed so as to be faded into the inside of the display region 105a from the outside thereof. Namely, as shown in (d) of FIG. 6, the animation parts C to E are not displayed while the animation is performed, and when the animation is completed, namely, when the movement of the animation parts A and B is stopped, the animation parts C to E are suddenly displayed in the predetermined positions as shown in (c) of FIG. 6.

Figure 7:
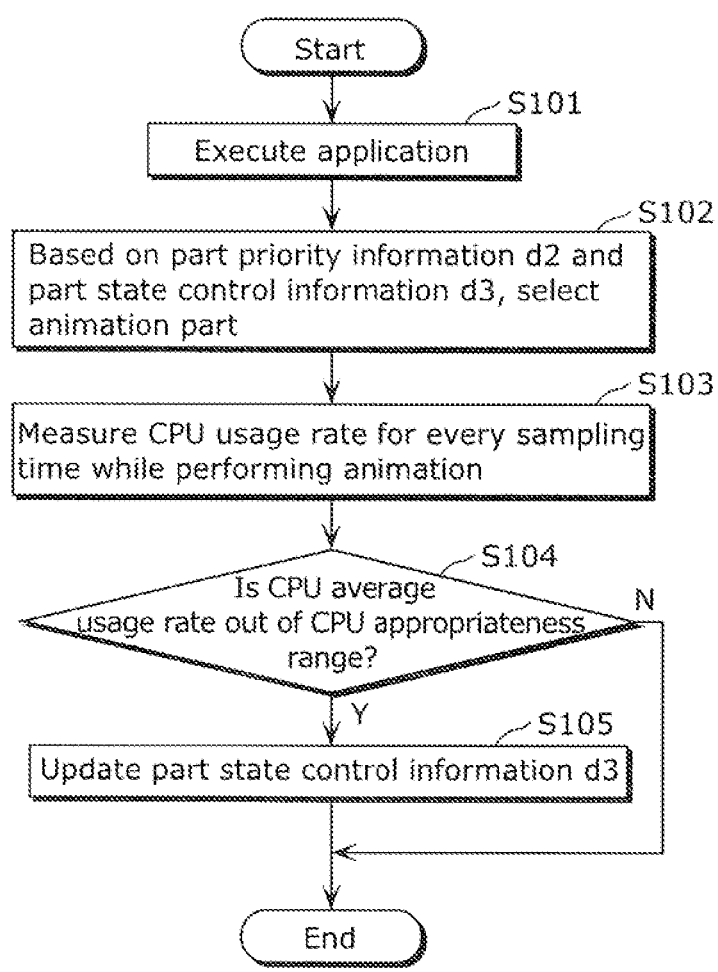
FIG. 7 is a flowchart showing an entire operation of the animation control device according to the embodiment of the present invention.

FIG. 7 is a flowchart showing the whole operation of the animation control device 100.

The animation control device 100 executes the application ap to be executed, the application ap being stored in the storage unit 101 (Step S101). Further, based on the part priority information d2 and the part state control information d3, the animation control device 100 selects the animation part for the animation from the plurality of animation parts set at the animation by the executed application ap (Step S102).

Next, the animation control device 100 performs the animation of the animation part selected in Step S102, and measures (or obtains) the CPU usage rate of the CPU 103 (the usage rate based on the whole apparatus) while the animation is performed for every sampling time (Step S103).

When the animation in the Step S103 is completed, from the CPU usage rate measured in Step S103, the animation control device 100 calculates the average value of the usage rate at which the CPU 103 is used only for the animation as the CPU average usage rate. Then, the animation control device 100 determines whether the CPU average usage rate is out of the CPU appropriateness range (Step S104).

Here, when the animation control device 100 determines that the CPU average usage rate is out of the CPU appropriateness range (Y in Step S104), the animation control device 100 updates the part state control information d3 (Step S105). On the other hand, when the animation control device 100 determines that the CPU average usage rate is not out of the CPU appropriateness range (N in Step S104), the animation control device 100 terminates the processing without updating the part state control information d3.

Such processing from Step S101 to S105 is repeatedly executed every time when an instruction to execute the application ap is received. Accordingly, when the animation control device 100 receives the instruction to execute the application ap after Step S104 or S105, the animation control device 100 repeatedly performs the processing from Step S101 again. Namely, when the part state control information d3 is updated in Step S105, the updated part state control information d3 is used for the subsequent processing in Step S102.

Figure 8:
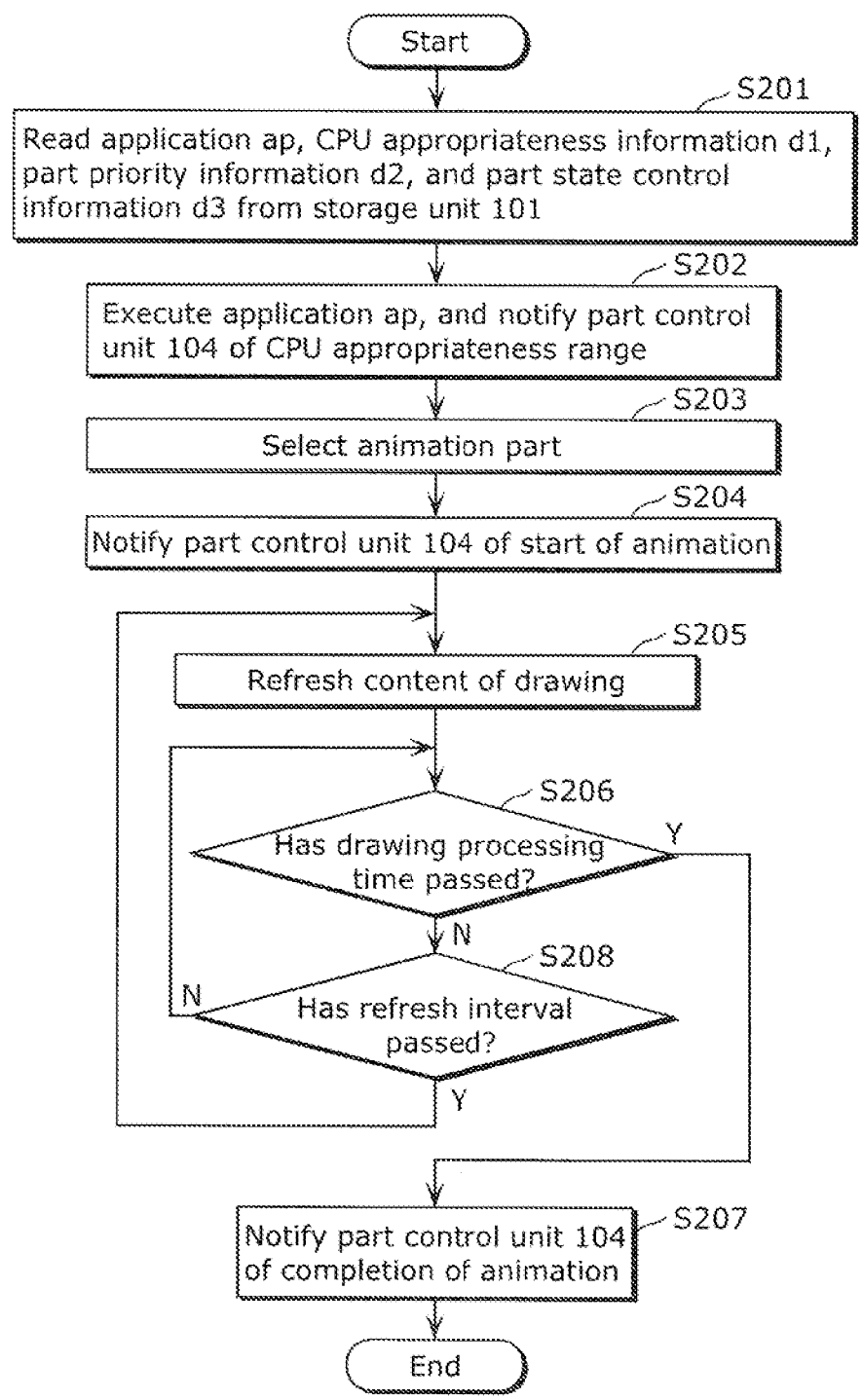
FIG. 8 is a flowchart showing operation of an executing unit according to the embodiment of the present invention.

FIG. 8 is a flowchart showing an operation of the executing unit 102.

The executing unit 102 reads the application ap to be executed, the CPU appropriateness information d1, the part priority information d2, and the part state control information d3 from the storage unit 101 (Step S201). The executing unit 102 executes the application ap to be executed, identifies the CPU appropriateness range corresponding to the executed application ap from the CPU appropriateness information d1, and notifies the part control unit 104 of the CPU appropriateness range (Step S202).

Next, based on the part priority information d2 and the part state control information d3, the executing unit 102 selects the animation part for the animation of the plurality of animation parts set in advance for the executed application ap (Step S203). Further, the executing unit 102 notifies the part control unit 104 of the start of the animation (Step S204).

When the executing unit 102 notifies the part control unit 104 of the start of the animation, the executing unit 102 starts the animation, and executes the processing to refresh the content of drawing (Step S205). Namely, the executing unit 102 produces the image to be displayed using the animation part selected in Step S203, and outputs the image to be displayed to the display unit 105. The display unit 105 receives the image to be displayed from the executing unit 102, and displays the image. Moreover, when such processing in Step S205 is repeated, based on the executed application ap and the content of control in the part state control information d3, the executing unit 102 refreshes the image to be displayed such that the state of the animation part in the image to be displayed (at least one of the position, the size, the shape, the color, and the degree of transparency), and outputs the refreshed image to be displayed to the display unit 105. Such processing in Step S205 is repeated to implement the animation.

When the processing to refresh the content of drawing is executed in Step S205, the executing unit 102 determines whether the drawing processing time has passed (Step S206). Here, when the executing unit 102 determines that the drawing processing time has passed (Y in Step S206), the executing unit 102 notifies the part control unit 104 of completion of the animation (Step S207). On the other hand, when the executing unit 102 determines that the drawing processing time has not passed (N in Step S206), the executing unit 102 further determines whether the refresh interval has passed (Step S208). Here, when the executing unit 102 determines that the refresh interval has passed (Y in Step S208), the executing unit 102 repeatedly performs the processing from Step S205. On the other hand, when the executing unit 102 determines that the refresh interval has not passed (N in Step S208), the executing unit 102 repeatedly performs the processing from Step S206. Namely, the executing unit 102 awaits passage of the drawing processing time or the refresh interval.

Figure 9:
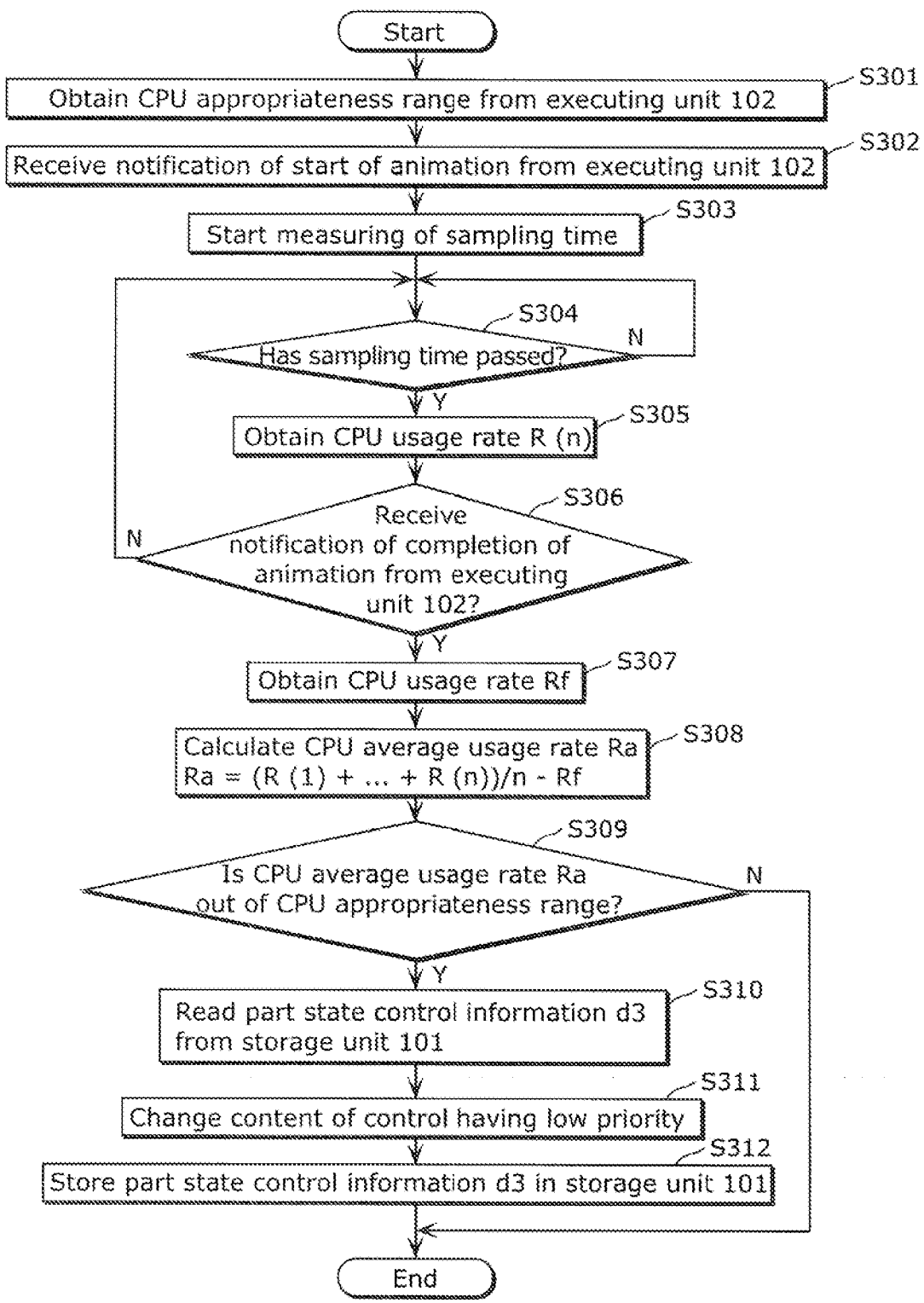
FIG. 9 is a flowchart showing an example of a part control unit according to the embodiment of the present invention.

FIG. 9 is a flowchart showing an operation of the part control unit 104.

The part control unit 104 obtains the CPU appropriateness range from the executing unit 102 (Step S301). When the part control unit 104 receives notification of the start of the animation (Step S302), the part control unit 104 starts repeated measurement of the sampling time (Step S303).

Next, the part control unit 104 determines whether the sampling time has passed (Step S304). Here, when the part control unit 104 determines that the sampling time has not passed (N in Step S304), the part control unit 104 repeatedly executes the processing in Step S304. Namely, the part control unit 104 awaits passage of the sampling time. On the other hand, when the part control unit 104 determines that the sampling time has passed (Y in Step S304), the part control unit 104 obtains and stores the CPU usage rate R (n) of the CPU 103 (Step S305). For example, when the operating system used in the apparatus or the animation control device 100 is Linux, a numeric value representing a state of the system is stored in a stat file under a/proc directory. Accordingly, the part control unit 104 accesses to the stat file, and obtains and stores the CPU usage rate at the time of access. The n in the CPU usage rate R (n) is a natural number, and n=1 in an initial state.

Next, the part control unit 104 determines whether the notification of completion of the animation is received from the executing unit 102 (Step S306). Here, when the part control unit 104 determines that the notification of completion of the animation is not received (N in Step S306), the part control unit 104 repeatedly performs the processing from Step S304. Thereby, Step S305 is repeatedly performed. At this time, n is increased only by 1 such that n=n+1. Accordingly, in Step S305, the number of n CPU usage rates R (1), R (2), . . . , R (n) are obtained. On the other hand, when the part control unit 104 determines that the notification of completion of the animation is received (Y in Step S306), the part control unit 104 obtains and stores the CPU usage rate Rf after the animation is completed (Step S307). At this time, the part control unit 104 obtains the CPU usage rate Rf by the same method as that in Step S305. Further, using the CPU usage rates R (1), R (2), . . . , R (n) obtained and stored in Step S305 and the CPU usage rate Rf obtained and stored in the Step S307, the part control unit 104 calculates the CPU average usage rate Ra that is the average of the usage rate of the CPU 103 only for the animation (Step S308). For example, the part control unit 104 calculates the CPU average usage rate Ra by Ra=(R (1)+R (2)+ . . . +R (n))/n−Rf. Accordingly, as the sampling time is shorter, a larger CPU usage rate R (n) can be obtained, and more accurate CPU average usage rate Ra can be calculated.

Then, the part control unit 104 determines whether the CPU average usage rate Ra calculated in Step S308 is out of the CPU appropriateness range obtained in Step S301 (Step S309). Here, when the part control unit 104 determines that the CPU average usage rate Ra is out of the CPU appropriateness range (Y in Step S309), the part control unit 104 reads the part state control information d3 from the storage unit 101 (Step S310), and changes the content of control corresponding to a low priority shown in the part state control information d3 (Step S311). For example, the part control unit 104 changes the content of control corresponding to a priority lower than a threshold or the lowest priority of the priorities shown in the part state control information d3. Thereby, the part state control information d3 is updated. Subsequently, the part control unit 104 stores the updated part state control information d3 in the storage unit 101 (Step S312). At this time, the part state control information d3 stored in the storage unit 101 before updating is overwritten and deleted.

Thus, in the present embodiment, when the usage rate of the CPU (CPU average usage rate), which is the amount of operation needed for animation of the plurality of animation parts according to a first content of control, is larger than the first appropriate value, the content of control for the animation of the drawing-target part having a low priority, namely the change target part is changed from the first content of control to the second content of control. Thereby, the animation of the animation part having a low priority is limited. On as the other hand, the content of control for the animation of the drawing-target part having a high priority, namely the non-change-target part is not changed. Accordingly, the animation of the animation part having a high priority is performed according to the first content of control without limitation. Further, when the amount of operation is large, the animation of the animation part having a low priority is limited. For this reason, the amount of operation can be suppressed, a margin can be given to the operation, and the animation of the animation part having a high priority can be properly performed. Accordingly, the animation of all the plurality of animation parts can be prevented from being limited, and reduction in the total quality of the animation to be displayed can be suppressed. Further, if the application developer sets a high priority for the animation part for the animation intended by the application developer in the part priority information d2, the animation intended by the application developer can be performed even if the usage rate of the CPU is high.

As above, the animation control device according to the present invention has been described using the embodiment, but the present invention will not be limited to these.

Figure 10:
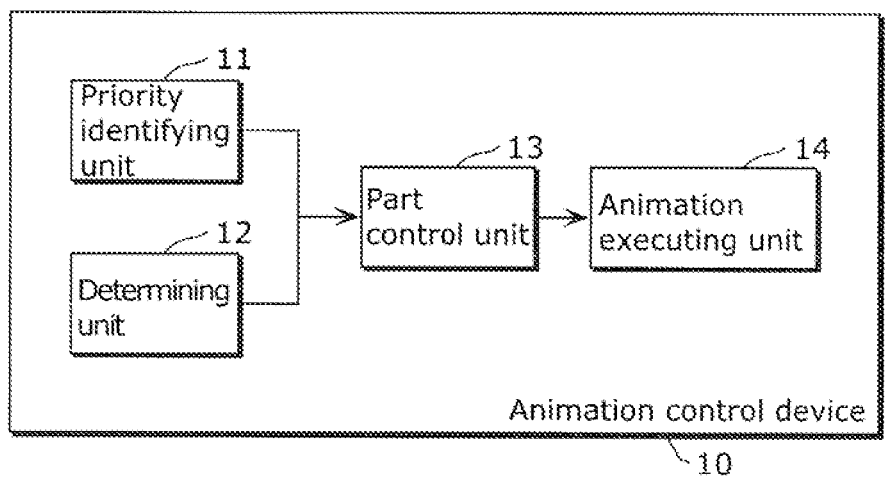
FIG. 10 is a block diagram showing a configuration of the animation control device according to the present invention.
Figure 11:
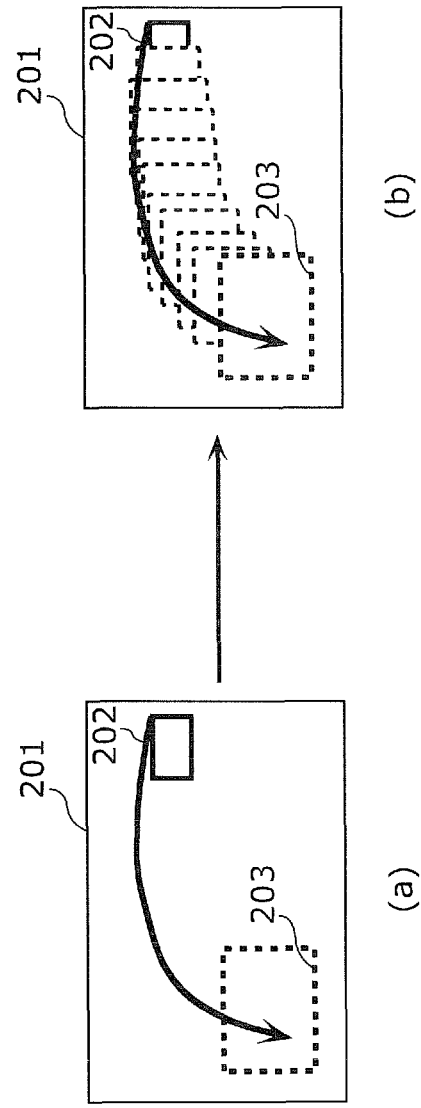
FIG. 11 is a drawing showing an example of animation by the conventional animation control device.

FIG. 10 is a block diagram showing a configuration of an animation control device according to the present invention.

An animation control device 10 is a device that controls animation according to an application program, the animation control device 10 including a priority identifying unit 11 that identifies priorities of a plurality of drawing-target parts, which are images for display, with reference to the part priority information d2 indicating the priorities of the plurality of drawing-target parts, the priorities being set in advance for the application program; an animation executing unit 14 that performs animation on the plurality of drawing-target parts; a determining unit 12 that determines whether a determination value is larger than a first appropriate value, the determination value being the amount of operation needed for the animation of the plurality of drawing-target parts by the animation executing unit 14 according to the first content of control; and a part control unit 13 that changes the content of control for the animation of the change target part from the first content of control to the second content of control so as to more significantly reduce the amount of operation needed for the animation of the change target part as the priority identified by the priority identifying unit 11 is lower, the change target part being the drawing-target part corresponding to the priority, when the determining unit 12 determines that the determination value is larger than the first appropriate value, wherein the animation executing unit 14 performs the animation of the change target part according to the second content of control, and performs the animation of the non-change-target part according to the first content of control, the non-change-target part being a drawing-target part other than the change target part among the plurality of drawing-target parts.

Here, the present invention shown in FIG. 10 and the embodiment have the following correspondence. Namely, the animation control device 10 corresponds to the animation control device 100 according to the embodiment. The constituent feature including the priority identifying unit 11 and the animation executing unit 14 corresponds to the executing unit 102 in the embodiment, and that including the determining unit 12 and the part control unit 13 corresponds to the part control unit 104 in the embodiment. Moreover, the application program and the drawing-target part respectively correspond to the application and the animation part in the embodiment. Further, the first content of control corresponds to the content of control for each priority included in the part state control information d3 shown in FIG. 4 in the embodiment, for example, "animation." The second content of control corresponds to the content of control for each priority included in the part state control information d3 shown in FIG. 5 in the embodiment, for example, "animation" or "no animation." The first content of control is a content of control determined on the animation of each of the drawing-target parts, and the second content of control is a content of control changed from the first content of control. Accordingly, when the determination is repeatedly performed by the determining unit 12 after the content of control for the animation of the change target part is changed from the first content of control to the second content of control, the second content of control is treated as the first content of control in the animation of the change target part.

Thereby, when the usage rate of the CPU (CPU average usage rate), which is the amount of operation needed for the animation of the plurality of drawing-target parts (animation part) according to the first content of control, is greater than the first appropriate value, the content of control for the animation of the drawing-target part having a low priority is changed from the first content of control to the second content of control to limit the animation of the drawing-target part having a low priority. On the other hand, because the content of control for the animation of the drawing-target part having a high priority is not changed, the animation of the drawing-target part having a high priority is performed according to the first content of control without being limited. Further, when the amount of operation is large, the animation of the drawing-target part having a low priority is limited. For this, the amount of operation can be suppressed, a margin can be given to the operation, and the animation of the drawing-target part having a high priority can be properly performed. Accordingly, limitation of the animation of all the plurality of drawing-target parts can be prevented, and reduction in the total quality of the animation to be displayed can be suppressed. Further, the application developer sets a high priority for the target drawing-target part for the intended animation in the part priority information d2. Thereby, the animation intended by the application developer can be performed even when the usage rate of the CPU is high.

Accordingly, the animation control device 10 according to the present invention may not include the components such as the display unit 105 and the CPU 103 as shown in the embodiment in FIG. 1.

Moreover, in the animation control device 100 according to the embodiment, as shown in the part priority information d2 in FIG. 3, the priority is expressed by two levels of "high" and "low." Alternatively, the priority may be further divided and expressed by three or more levels. For example, the priority of the animation part may be expressed by five levels, and the part priority information d2 may be set such that the priorities of animation parts A, B, C, D, and E are lower in this order. Thereby, the animation of the animation parts A, B, C, D, and E can be individually limited or controlled. In this case, in the flowchart shown in FIG. 7, the animation is performed in Step S103, and every time when it is determined in Step S104 that the CPU average usage rate is out of the CPU appropriateness range, the content of control for the animation part is changed from "animation" to "no animation" in Step S105 in the part state control information d3 sequentially from the animation parts E, D, C, and B having a lower priority in this order.

Moreover, in the animation control device 100 according to the embodiment, as shown in the part state control information d3 in FIGS. 4 and 5, the content of control is "animation" or "no animation." For example, the content of control may be a frame rate such as a "normal frame rate" or a "low frame rate." The normal frame rate is higher than the low frame rate. Thereby, while the animation of the animation part having a high priority is performed at the normal frame rate, the animation of the animation part having a low priority is performed at the low frame rate. For example, at the low frame rate, the image to be displayed is skipped such that the processing to refresh the content of drawing is performed only once every time when the refresh interval passes twice. Thereby, the CPU average usage rate for the animation can fall within the CPU appropriateness range, and reduction in the quality of the image that the user sees can be suppressed as much as possible, compared to the case where the animation having a low priority is not performed.

Moreover, in the animation control device 100 according to the embodiment, the part priority information d2 is stored in the storage unit 101 in advance. Alternatively, the part priority information d2 may be automatically generated. In this case, the animation control device 100 includes an information generating unit that determines the priority for each of the animation parts, and generates part priority information d2 indicating the priority determined for each of the animation parts. The information generating unit uses at least one of the size of the region to be displayed of the animation part, the size of data thereof, the operation history of the user, and the animation effect of the animation part as a parameter for determining the priority of the animation part.

For example, the parameter is the size of the region to be displayed of the animation part, and the plurality of animation parts include a first animation part and a second animation part having a smaller size of the region to be displayed than that of the first animation part. In such a case, the information generating unit determines priorities of the first and second animation parts such that the priority of the first animation part is higher than that of the second animation part.

Alternatively, the parameter is the size of data of the animation part, and the plurality of animation parts include a first animation part and a second animation part having a smaller size of data than that of the first animation part. In such a case, the information generating unit determines priorities of the first and second animation parts such that the priority of the first animation part is higher than that of the second animation part.

For example, the application developer tends to more strongly desire that the animation of the animation part should be performed as the animation part has a larger size of the region to be displayed or a larger size of data. Accordingly, the priority is determined according to the size of the region to be displayed or the size of data, and the part priority information d2 indicating the determined priority is generated; thereby, the application developer does not need to intentionally set the priority in the part priority information d2, and can improve the developing efficiency of the application.

Alternatively, the parameter is the operation history of the user. In this case, the animation control device 100 further includes a history recording unit that records a history of the animation part operated by the user as an operation history for each of the animation parts. The information generating unit determines the priority for each animation part, based on the recorded operation history of the animation part.

For example, the application developer tends to more strongly desire that the animation of the animation part should be performed as the animation part is operated more frequently by the user, or the animation part is operated in a shorter time from the previous operation. Accordingly, the priority is determined based on the operation history of the animation part, and the part priority information d2 indicating the determined priority is generated; thereby, the application developer does not need to intentionally set the priority in the part priority information d2, and can improve the developing efficiency of the application.

Moreover, in the embodiment, as an example in which the CPU average usage rate for the animation is out of the CPU appropriateness range, the case has been mainly described in which the CPU average usage rate is higher than the CPU appropriateness range. Namely, when the CPU average usage rate is higher than the first appropriate value, which is the upper limit value of the CPU appropriateness range, the part state control information d3 is updated such that the animation of the animation part having a low priority is limited.

However, when the CPU average usage rate for the animation is out of the CPU appropriateness range, the CPU average usage rate may be lower than the CPU appropriateness range. Namely, when the CPU average usage rate is lower than the second appropriate value, which is the lower limit value of the CPU appropriateness range, the part state control information d3 may be updated such that the limitation of the animation of the animation part having a low priority is cancelled. In such a case, the part control unit 104 (determining unit 12) further determines whether the CPU average usage rate is smaller than the second appropriate value smaller than the first appropriate value. When it is determined that the CPU average usage rate is smaller than the second appropriate value, the part control unit 104 (part control unit 13) further changes the content of control for the animation of the change processing target part from the first content of control to the third content of control so as to more significantly increase the amount of operation needed for the animation of the change target part at a smaller change rate as the priority identified by said priority identifying unit is lower, the change target part being the drawing-target part corresponding to the priority, when said determining unit determines that the determination value is smaller than the second appropriate value. Moreover, the executing unit 102 (animation executing unit 14) further performs the animation of the change processing target part according to the third content of control, and performs the animation of a non-change-target part according to the first content of control, the non-change-target part being an animation part other than the change processing target part among the plurality of animation parts.

Thereby, when the animation of the animation part having a low priority is limited more than necessary by the first content of control, the limitation can be cancelled. For example, as shown in FIG. 5, when the first content of control "no animation" is set for the low priority in the part state control information d3, and the animation of the plurality of animation parts is performed according to the part state control information d3, the CPU average usage rate for the animation of the plurality of animation parts may be lower than the CPU appropriateness range (second appropriate value). In this case, the part control unit 104 relaxes the first content of control "no animation" set for the low priority in the part state control information d3, and updates the content of control to the third content of control "the low frame rate." Thereby, the CPU average usage rate for the animation of the plurality of animation parts can fall within the CPU appropriateness range, and more appropriate animation can be implemented.

Moreover, when the animation part having a high priority, the animation part having a middle priority, and the animation part having a low priority exist, the contents of control of the animation of the animation part having a middle priority and the animation part having a low priority are changed from the first content of control to the third content of control such that the amount of operation needed for the animation of the animation part having a middle priority is more significantly increased at a larger change rate than that needed for the animation of the animation part having a low priority. Namely, the limitation on the animation part having a middle priority is relaxed with a higher priority than the limitation on the animation of the animation part having a low priority. Accordingly, even when the limitation of the animation is cancelled, the animation of the animation part having a low priority can be more limited than the animation of the animation part having a middle priority and the animation part having a high priority.

Moreover, in the embodiment, the usage rate (CPU usage rate or CPU average usage rate) is used as the amount of operation of the CPU 103. Instead of such a relative value such as the proportion (percentage), an absolute value may be used.

Moreover, in the embodiment, the animation of the plurality of animation parts A to E according to the part state control information d3 shown in FIG. 4 is performed, and the CPU average usage rate during the execution is obtained, calculated, or measured. Alternatively, without performing the animation, the CPU average usage rate may be estimated. For example, based on the size of data of the animation parts A to E and the content of control thereof shown in the part state control information d3, the CPU average usage rate is estimated. Thereby, the animation control device 100 can properly update the part state control information d3 without performing the animation.

Moreover, the present invention also includes the following cases.

(1) The animation control device is specifically a computer system including a microprocessor, a ROM, a RAM, a hard disk unit, a display unit, a keyboard, and a mouse. A computer program is stored in the RAM or the hard disk unit. The microprocessor operates according to the computer program. Thereby, the animation control device achieves the function. Here, the computer program is composed of a combination of command codes indicating instructions to the computer in order to achieve predetermined functions.

(2) Part of or all the components that form the animation control device may be composed of a single system LSI (Large Scale Integration: large-scale integrated circuit). The system LSI is an ultra multifunctional LSI manufactured by integrating a plurality of constituent units on a single chip, and specifically a computer system including a microprocessor, a ROM, and a RAM. A computer program is stored in the RAM. The microprocessor operates according to the computer program. Thereby, the system LSI achieves the function.

Alternatively, each of the components that form the animation control device may be individually formed into a single chip, or the components may be formed into a single chip such that part of or all the components are included.

Here, the LSI is referred to as the system LSI. According to the difference in integration density, the LSI may also be referred to as an IC, an LSI, a super LSI, and an ultra LSI. Moreover, a method for integration of the circuit is not limited to the LSI, and the integrated circuit may be implemented as a dedicated circuit or a general-purpose processor. Alternatively, an FPGA (Field Programmable Gate Array) that is programmable after manufacturing of the LSI, or a reconfigurable processor allowing reconnection and reconfiguration of a circuit cell in the LSI may be used.

Further, in the case where the advancement of the semiconductor technology or another derivative technology thereof introduces and a new circuit integrating technique which will replace the LSI, the technology may be used as a matter of course to integrate the components. Examples thereof may include application of biotechnology.

(3) Part of or all the components that form the animation control device may be composed of an IC card or a single module detachably attached to the respective devices. The IC card or the module is a computer system including a microprocessor, a ROM, and a RAM. The IC card or the module may include the ultra multifunctional LSI. The microprocessor operates according to the computer program. Thereby, the IC card or the module achieves the function. The IC card or the module may have tamper proofness.

(4) The present invention may be the methods described above. Alternatively, these methods may be a computer program implemented by a computer, or digital signals composed of the computer program.

Moreover, the present invention may be those obtained by recording the computer program or the digital signals in a computer-readable recording medium such as a flexible disk, a hard disk, a CD-ROM, an MO, a DVD, a DVD-ROM, a DVD-RAM, a BD (Blu-ray Disc), and a semiconductor memory. Alternatively, the present invention may be the digital signals recorded in these recording media.

Moreover, the present invention may be the computer program or the digital signal transmitted via an electric communication line, a wireless or wired communication line, a network such as the Internet, and data broadcasting.

Alternatively, the present invention may be a computer system including a microprocessor and a memory; the memory stores the computer program above, and the microprocessor operates according to the computer program.

Alternatively, the program or the digital signals may be recorded in a recording medium and transported, or may be transmitted via a network to implement the present invention by other independent computer system.

(5) Additionally, a semiconductor chip obtained by integrating the animation control device according to the present invention can be combined with a display for drawing an image to form a drawing apparatus for various applications. The present invention can be used as an information drawing device for mobile phones, television sets, digital video recorders, digital video cameras, car navigation systems, and the like. As the display to be combined, a cathode-ray tube (CRT) display, a flat display such as liquid crystal displays, PDP (plasma display panel) displays, and organic EL displays, and a projection display such as projectors can be used.

(6) The embodiment and other variations may be combined.

The animation control device according to the present invention can suppress reduction in the total quality of the animation to be displayed, and perform the animation intended by an application developer. For example, the animation control device according to the present invention can be used for battery-operated mobile display terminals such as mobile phones, mobile music players, digital cameras, or digital video cameras. Moreover, the animation control device according to the present invention is highly useful as an information display device for menu display, a Web browser, an editor, an EPG, or display of a map, and the like in high-resolution information display apparatuses such as television sets, digital video recorders, or car navigation systems.

REFERENCE SIGNS LIST

10 Animation control device
11 Priority identifying unit
12 Determining unit
13 Part control unit
14 Animation executing unit
100 Animation control device
101 Storage unit
102 Executing unit
103 CPU
104 Part control unit
105 Display unit
200 Part storing unit
ap Application
d1 CPU appropriateness information
d2 Part priority information
d3 Part state control information

The invention claimed is:

1. An animation control device that controls animation according to a plurality of application programs, the device comprising:
    a storage unit configured to store a table including the plurality of application programs, different CPU usage ranges corresponding to each of the application programs and part priority information for a plurality of drawing-target parts associated with the application programs, wherein each CPU usage range comprises a first appropriate value as an upper limit and a second appropriate value as a lower limit;
    a priority identifying unit configured to identify priorities of the plurality of drawing-target parts, which are images for display, with reference to the part priority information indicating the priorities of the plurality of drawing-target parts, the priorities being set for each application program;
    a selecting unit configured to select an application program for displaying an animation of a drawing-target part, the application program having a corresponding CPU usage range;
    an animation executing unit configured to perform animation of the plurality of drawing-target parts;
    a determining unit configured to determine whether a determination value is greater than the first appropriate value, and determine whether the determination value is smaller than the second appropriate value smaller than the first appropriate value, the determination value being an amount of CPU usage and operations needed for the animation of the drawing-target part by the animation executing unit according to a first content of control; and
    a part control unit configured to (i) change a content of control for the animation of a change target part from the first content of control to a second content of control so as to more significantly reduce the amount of CPU usage and operations needed for the animation of the change target part when a priority identified by the priority identifying unit is lower, the change target part being the drawing-target part corresponding to the priority, when the determining unit determines that the determination value is greater than the first appropriate value, and (ii) change the content of control for the animation of the change target part from the first content of control to a third content of control so as to more significantly increase the amount of CPU usage and operations needed for the animation of the change target part at a smaller change rate when the priority identified by the priority identifying unit is lower, the change target part being the drawing-target part corresponding to the priority, when the determining unit determines that the determination value is smaller than the second appropriate value,
    wherein when the determining unit determines that the determination value is greater than the first appropriate value, the animation executing unit is configured to perform the animation of the change target part according to the second content of control, and perform the animation of a non-change-target part according to the first content of control, the non-change-target part being a drawing-target part other than the change target part among the plurality of drawing-target parts, and
    when the determining unit determines that the determination value is smaller than the second appropriate value, the animation executing unit is configured to perform the animation of the change target part according to the third content of control, and perform the animation of the non-change-target part according to the first content of control, the non-change-target part being the drawing-target part other than the change target part among the plurality of drawing-target parts.

2. The animation control device according to claim 1, further comprising:
    a measuring unit configured to measure the amount of operation used for the animation of the plurality of drawing-target parts by the animation executing unit according to the first content of control,
    wherein the determining unit is configured to perform the determination using the amount of operation measured by the measuring unit as the determination value,
    the storage unit is configured to store part state control information indicating the first content of control for each priority;
    the part control unit is configured to change the first content of control corresponding to the priority of the change target part to the second or third contents of control, the first content of control corresponding to the priority of the change target part being indicated by the part state control information stored in the storage unit, the animation executing unit is configured to perform the animation of the plurality of drawing-target parts according to the first, second, and third contents of control which are indicated by the part state control information stored in the storage unit.

3. The animation control device according to claim 1, further comprising a central processing unit (CPU), wherein the animation executing unit is configured to cause the CPU to perform operations needed for the animation of the plurality of drawing-target parts according to the first content of control, and the determining unit is configured to perform the determination by treating, as the determination value, a usage rate of the CPU used for the operations.

4. The animation control device according claim 1, wherein the part control unit is configured to change the content of control for the animation of the change target part from the first content of control to the second content of control, the first content of control indicating that the animation is performed, the second content of control indicating that the animation is not performed, and the animation executing unit is configured to perform the animation of the non-change-target part according to the first content of control, and not to perform the animation of the change target part according to the second content of control.

5. The animation control device according to claim 1, wherein the part control unit is configured to change the content of control for the animation of the change target part from the first content of control indicating a first frame rate to the second content of control indicating a second frame rate lower than the first frame rate, and the animation executing unit is configured to perform the animation of the non-change-target part according to the first content of control at the first frame rate, and perform the animation of the change target part according to the second content of control at the second frame rate.

6. The animation control device according to claim 1, the device further comprising an information generating unit configured to determine a priority of each of the drawing-target parts, and generate the part priority information indicating the determined priority.

7. The animation control device according to claim 6, wherein the plurality of drawing-target parts includes a first drawing-target part and a second drawing-target part having a smaller size of a region to be displayed than a size of a region to be displayed of the first drawing-target part, and the information generating unit is configured to determine the priorities of the first and second drawing-target parts such that the priority of the first drawing-target part is higher than the priority of the second drawing-target part.

8. The animation control device according to claim 6, wherein the plurality of drawing-target parts includes a first drawing-target part and a second drawing-target part having a smaller size of data than a size of data of the first drawing-target part, and the information generating unit is configured to determine priorities of the first and second drawing-target parts such that the priority of the first drawing-target part is higher than the priority of the second drawing-target part.

9. The animation control device according to claim 6, the device further comprising a history recording unit configured to record a history of the drawing-target part operated by a user as an operation history for each of the drawing-target parts, wherein the information generating unit is configured to determine the priority of each drawing-target part, based on the recorded operation history of the drawing-target part.

10. An animation control method for controlling animation according to a plurality of application programs, the method comprising:

storing a table including the plurality of application programs, different CPU usage ranges corresponding to each of the application programs and part priority information for a plurality of drawing-target parts associated with the application programs, wherein each CPU usage range comprises a first appropriate value as an upper limit and a second appropriate value as a lower limit;

identifying priorities of the plurality of drawing-target parts, which are images for display, with reference to the part priority information indicating the priorities of the plurality of drawing-target parts, the priorities being set for each application program;

selecting an application program for displaying an animation of a drawing-target part, the application program having a corresponding CPU usage range;

performing animation of the plurality of drawing-target parts;

determining whether a determination value is greater than the first appropriate value, and determining whether the determination value is smaller than the second appropriate value smaller than the first appropriate value, the determination value being an amount of CPU usage and operations needed for the animation of the drawing-target part by the performing of the animation according to a first content of control;

changing a content of control for the animation of a change target part from the first content of control to a second content of control so as to more significantly reduce the amount of CPU usage and operations needed for the animation of the change target part when an identified priority is lower, the change target part being the drawing-target part corresponding to the priority, when it is determined that the determination value is greater than the first appropriate value;

changing the content of control for the animation of the change target part from the first content of control to a third content of control so as to more significantly increase the amount of CPU usage and operations needed for the animation of the change target part at a smaller change rate when the identified priority is lower, the change target part being the drawing-target part corresponding to the priority, when it is determined that the determination value is smaller than the second appropriate value, wherein in performing the determining step, when it is determined that the determination value is smaller than the second appropriate value, in the performing of the animation, the animation of the change target part is performed according to the second content of control, and the animation of a non-change-target part is performed according to the first content of control, the non-change-target part being a drawing-target part other than the change target part among the plurality of drawing-target parts, and when it is determined that the determination value is smaller than the second appropriate value, the animation of the change target part is performed according to the third content of control, and the animation of the non-change-target part is performed according to the first content of control, the non-change-target part being the drawing-target part other than the change target part among the plurality of drawing-target parts.

11. A program for controlling animation according to a plurality of application programs stored in a non-transitory computer readable recording medium, the program causing a computer to execute steps comprising:

storing a table including the plurality of application programs, different CPU usage ranges corresponding to each of the application programs and part priority information for a plurality of drawing-target parts associated with the application programs, wherein each CPU usage range comprises a first appropriate value as an upper limit and a second appropriate value as a lower limit;

identifying priorities of the plurality of drawing-target parts, which are images for display, with reference to the part priority information indicating the priorities of the plurality of drawing-target parts, the priorities being set for each application program;

selecting an application program for displaying an animation of a drawing-target part, the application program having a corresponding CPU usage range;

performing animation of the plurality of drawing-target parts;

determining whether a determination value is greater than the first appropriate value, and determining whether the determination value is smaller than the second appropriate value smaller than the first appropriate value, the determination value being an amount of CPU usage and operations needed for the animation of the drawing-target part by the performing of the animation according to a first content of control;

changing a content of control for the animation of a change target part from the first content of control to a second content of control so as to more significantly reduce the amount of CPU usage and operations needed for the animation of the change target part when an identified priority is lower, the change target part being the drawing-target part corresponding to the priority, when it is determined that the determination value is greater than the first appropriate value;

changing the content of control for the animation of the change target part from the first content of control to a third content of control so as to more significantly increase the amount of CPU usage and operations needed for the animation of the change target part at a smaller change rate when the identified priority is lower, the change target part being the drawing-target part corresponding to the priority, when it is determined that the determination value is smaller than the second appropriate value, wherein in performing the determining step, when it is determined that the determination value is smaller than the second appropriate value, in the performing of the animation, the animation of the change target part is performed according to the second content of control, and the animation of a non-change-target part is performed according to the first content of control, the non-change-target part being a drawing-target part other than the change target part among the plurality of drawing-target parts, and when it is determined that the determination value is smaller than the second appropriate value, the animation of the change target part is performed according to the third content of control, and the animation of the non-change-target part is performed according to the first content of control, the non-change-target part being the drawing-target part other than the change target part among the plurality of drawing-target parts.

12. An integrated circuit that controls animation according to a plurality of application programs, the integrated circuit comprising:

a storage unit configured to store a table including the plurality of application programs, different CPU usage ranges corresponding to each of the application programs and part priority information for a plurality of drawing-target parts associated with the application programs, wherein each CPU usage range comprises a first appropriate value as an upper limit and a second appropriate value as a lower limit;

a priority identifying unit configured to identify priorities of the plurality of drawing-target parts, which are images for display, with reference to the part priority information indicating the priorities of the plurality of drawing-target parts, the priorities being set for each application program;

a selecting unit configured to select an application program for displaying an animation of a drawing-target part, the application program having a corresponding CPU usage range;

an animation executing unit configured to perform animation of the plurality of drawing-target parts;

a determining unit configured to determine whether a determination value is greater than the first appropriate value, and determine whether the determination value is smaller than the second appropriate value smaller than the first appropriate value, the determination value being an amount of CPU usage and operations needed for the animation of the drawing-target part by the animation executing unit according to a first content of control; and a part control unit configured to (i) change a content of control for the animation of a change target part from the first content of control to a second content of control so as to more significantly reduce the amount of CPU usage and operations needed for the animation of the change target part when a priority identified by the priority identifying unit is lower, the change target part being the drawing-target part corresponding to the priority, when the determining unit determines that the determination value is greater than the first appropriate value, and (ii) change the content of control for the animation of the change target part from the first content of control to a third content of control so as to more significantly increase the amount of CPU usage and operations needed for the animation of the change target part at a smaller change rate when the priority identified by the priority identifying unit is lower, the change target part being the drawing-target part corresponding to the priority, when the determining unit determines that the determination value is smaller than the second appropriate value, wherein when the determining unit determines that the determination value is greater than the first appropriate value, the animation executing unit is configured to perform the animation of the change target part according to the second content of control, and perform the animation of a non-change-target part according to the first content of control, the non-change-target part being a drawing-target part other than the change target part among the plurality of drawing-target parts, and when the determining unit determines that the determination value is smaller than the second appropriate value, the animation executing unit is configured to perform the animation of the change target part according to the third content of control, and perform the animation of the non-change-target part according to the first content of control, the non-change-target part being the drawing-target part other than the change target part among the plurality of drawing-target parts.

\* \* \* \* \*